(12) United States Patent
Feng

(10) Patent No.: US 11,017,282 B2
(45) Date of Patent: May 25, 2021

(54) EMPLOYEE CARD, EMPLOYEE INFORMATION MANAGEMENT METHOD AND SYSTEM

(71) Applicant: BOE TECHNOLOGY GROUP CO., LTD., Beijing (CN)

(72) Inventor: Feng Feng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/613,381

(22) PCT Filed: Mar. 12, 2019

(86) PCT No.: PCT/CN2019/077818
§ 371 (c)(1),
(2) Date: Mar. 4, 2020

(87) PCT Pub. No.: WO2019/179335
PCT Pub. Date: Sep. 26, 2019

(65) Prior Publication Data
US 2020/0272876 A1 Aug. 27, 2020

(30) Foreign Application Priority Data
Mar. 20, 2018 (CN) .......................... 201810231140.8

(51) Int. Cl.
*G06K 19/077* (2006.01)
*H04B 17/318* (2015.01)
(Continued)

(52) U.S. Cl.
CPC ..... *G06K 19/07701* (2013.01); *G06F 3/0416* (2013.01); *G06F 3/147* (2013.01);
(Continued)

(58) Field of Classification Search
CPC ............... G06K 17/00; G06K 19/067; G06K 19/07701; G06F 3/0412; G06F 3/0416;
(Continued)

(56) References Cited

U.S. PATENT DOCUMENTS

2019/0197815 A1* 6/2019 Kamal ................ H04L 63/0823
2020/0249835 A1* 8/2020 Ueno .................... G06F 3/0486

FOREIGN PATENT DOCUMENTS

| CN | 1928953 A | 3/2007 |
|---|---|---|
| CN | 204256763 U | 4/2015 |

(Continued)

*Primary Examiner* — Nelson M Rosario
(74) *Attorney, Agent, or Firm* — Muncy, Geissler, Olds & Lowe, P.C.

(57) ABSTRACT

An employee card, an employee information management method and system are disclosed. The employee card includes a communication unit and a display screen coupled to the communication unit. The communication unit is configured to receive, according to a distinguishable identifier of the employee card, employee-related information corresponding to the distinguishable identifier. The display screen is configured to obtain the employee-related information from the communication unit and display the employee-related information. The employee-related information includes at least one of following information: an employee name, an employee job title, an employee job code, or a department to which an employee belongs.

15 Claims, 3 Drawing Sheets

(51) Int. Cl.
| | |
|---|---|
| *H04W 4/029* | (2018.01) |
| *G06F 3/041* | (2006.01) |
| *G06F 3/147* | (2006.01) |
| *G09G 3/34* | (2006.01) |
| *G06F 3/0482* | (2013.01) |
| *H04W 88/08* | (2009.01) |

(52) U.S. Cl.
CPC ........... *G09G 3/344* (2013.01); *H04B 17/318* (2015.01); *H04W 4/029* (2018.02); *G06F 3/0482* (2013.01); *H04W 88/08* (2013.01)

(58) Field of Classification Search
CPC .................. G06F 3/147; G06F 3/0482; G06Q 10/063114; G06Q 10/105; G06Q 10/1091; G09F 9/37; G09G 3/344; H04B 17/318; H04W 4/00; H04W 4/029; H04W 4/80; H04W 88/08
See application file for complete search history.

(56) References Cited

FOREIGN PATENT DOCUMENTS

| | | |
|---|---|---|
| CN | 105357628 A | 2/2016 |
| CN | 108389522 A | 8/2018 |
| CN | 207883246 U | 9/2018 |
| WO | WO-2011-142122 A1 | 11/2011 |

* cited by examiner

EMPLOYEE CARD, EMPLOYEE INFORMATION MANAGEMENT METHOD AND SYSTEM

CROSS-REFERENCE TO RELATED APPLICATION

This application is the U.S. national phase of PCT Application No. PCT/CN2019/077818 filed on Mar. 12, 2019, which claims a priority of the Chinese patent application No. 201810231140.8 filed in China on Mar. 20, 2018, disclosures of which are incorporated herein by reference in their entireties.

TECHNICAL FIELD

The present disclosure relates to, but not limited to, local area network (LAN) technologies, in particular to an employee card, an employee information management method and system.

BACKGROUND

Employee card is a kind of information card issued by modern enterprises to their employees for the purpose of employee identification. The employee cards in the related art are generally cards made of paper or plastics, and the enterprises to which employees belong and basic information of the employees are recorded in the employee cards.

SUMMARY

A summary of subject matters detailed in the present disclosure is provided below, and is by no means a limitation of the scope of claims.

Embodiments of the present disclosure provide an employee card, which includes a communication unit and a display screen coupled to the communication unit. The communication unit is configured to receive, according to a distinguishable identifier of the employee card, employee-related information corresponding to the distinguishable identifier; and the display screen is configured to obtain the employee-related information from the communication unit and display the employee-related information, where the employee-related information includes at least one of following information: an employee name, an employee job title, an employee job code, or a department to which an employee belongs.

In some embodiments, the employee card further includes: a display driver circuit, a control unit, a built-in integrated circuit (IC), a clock chip, a storage chip and a peripheral interface, where the display screen is coupled to the display driver circuit, the display driver circuit is coupled to the peripheral interface, and the peripheral interface is coupled to the control unit; the communication unit is coupled to the control unit; the built-in IC is coupled to the clock chip and the storage chip; and the control unit is coupled to the peripheral interface and the built-in IC.

In some embodiments, the employee-related information further includes a contact list, the employee card further includes a touch driver circuit and a touch screen coupled to the touch driver circuit, the communication unit is configured to establish a communication connection between the employee card and other employee card, and push information selected from the contact list to the other employee card according to touch operation information from the touch screen; and the touch screen overlies the display screen, and the touch screen is coupled to the control unit via the touch driver circuit and is configured to receive the touch operation information for selecting the information from the contact list and pushing the information.

In some embodiments, the communication unit is further configured to receive a notification message from a base station; and the display screen is further configured to obtain the notification message from the communication unit and display the notification message.

In some embodiments, the display screen is an electrophoretic ink (E-ink) screen.

Some embodiments of the present disclosure provide an employee information management system, which includes: a server and an employee card. The server is configured to write, according to a distinguishable identifier of the employee card, employee-related information corresponding to the distinguishable identifier, to the employee card; the employee card includes a communication unit and a display screen coupled to the communication unit. The communication unit is configured to receive, according to the distinguishable identifier of the employee card, the employee-related information corresponding to the distinguishable identifier transmitted by the server; and the display screen is configured to obtain the employee-related information from the communication unit and display the employee-related information, where the employee-related information includes at least one of following information: an employee name, an employee job title, an employee job code, or a department to which an employee belongs.

In some embodiments, the employee card further includes: a display driver circuit, a control unit, a built-in integrated circuit (IC), a clock chip, a storage chip and a peripheral interface, where the display screen is coupled to the display driver circuit, the display driver circuit is coupled to the peripheral interface, and the peripheral interface is coupled to the control unit; the communication unit is coupled to the control unit; the built-in IC is coupled to the clock chip and the storage chip; and the control unit is coupled to the peripheral interface and the built-in IC.

In some embodiments, the employee-related information further includes a contact list, the employee card further includes a touch driver circuit and a touch screen coupled to the touch driver circuit, the communication unit is configured to establish a communication connection between the employee card and other employee card, and push information selected from the contact list to the other employee card according to touch operation information obtained from the touch screen; and the touch screen overlies the display screen, is coupled to the control unit via the touch driver circuit and is configured to receive the touch operation information for selecting the information from the contact list and pushing the information.

In some embodiments, the employee information management system further includes a base station; the server is further configured to transmit a notification message to the base station; the base station is configured to receive the notification message from the server and transmit the notification message to at least one employee card; the communication unit is further configured to receive the notification message from the base station; and the display screen is further configured to obtain the notification message from the communication unit and display the notification message.

In some embodiments, the base station is further configured to determine a signal strength of the communication unit of the at least one employee card, and feed back the signal strength to the server; and the server is further configured to determine, according to the signal strength, at least one of position information or moving track information of the at least one employee card.

In some embodiments, the display screen is an E-ink screen.

Some embodiments of the present disclosure provide an employee information management method, which includes: receiving, by an employee card, employee-related information written according to a distinguishable identifier; and displaying, by a display screen of the employee card, the employee-related information; where the employee-related information includes at least one of following information: an employee name, an employee job title, an employee job code, or a department to which an employee belongs.

In some embodiments, after receiving, by the employee card, the employee-related information written according to the distinguishable identifier, the employee information management method further includes: establishing, by the employee card, a communication connection between the employee card and other employee card; and selecting, by the employee card, information from a contact list according to touch operation information, and pushing, by the employee card, the selected information to the other employee card.

In some embodiments, after receiving, by the employee card, the employee-related information written according to the distinguishable identifier, the employee information management method further includes: receiving, by the employee card, a notification message from a base station, where the notification message is transmitted by a server to the base station.

In some embodiments, after receiving, by the employee card, the employee-related information written according to the distinguishable identifier, the employee information management method further includes: determining, by the server, at least one of position information or moving track information of the employee card by means of at least three base stations.

BRIEF DESCRIPTION OF THE DRAWINGS

The accompanying drawings are used to facilitate further understanding of technical solutions of the present disclosure and are a part of the specification. The drawings, in conjunction with embodiments of the present application, are meant to illustrate the technical solutions of the present disclosure and by no means constitute a limitation of the technical solutions of the present disclosure.

DETAILED DESCRIPTION

To describe technical solutions of the present disclosure more clearly, embodiments of the present disclosure are described in detail hereinafter with reference to the accompanying drawings. Embodiments in the present application and features in the embodiments may be combined with each other arbitrarily in case of no conflict.

The steps as shown in the accompanying flow charts may be implemented in a computer system, for example, implemented by a set of computer executable instructions. In addition, although logical orders are illustrated in the flow charts, in some cases the illustrated or described steps may be executed in an order other than those shown.

In the related art, the employee card does not just record basic information of the employee, and the employee cards of some enterprises are further provided with the radio frequency (RF) function to achieve access control, as a result, the employee card is very important to an employee.

The employee card in the related art has limited function and is generally not reusable. For example, when an employee quits, his employee card is rendered obsolete, and when a new employee joins the enterprise, a new employee card has to be custom-made according to his information such as name and job title, which degrades the utilization of the employee card by the enterprise and increases time and resource required to make the employee card.

Figure 1:
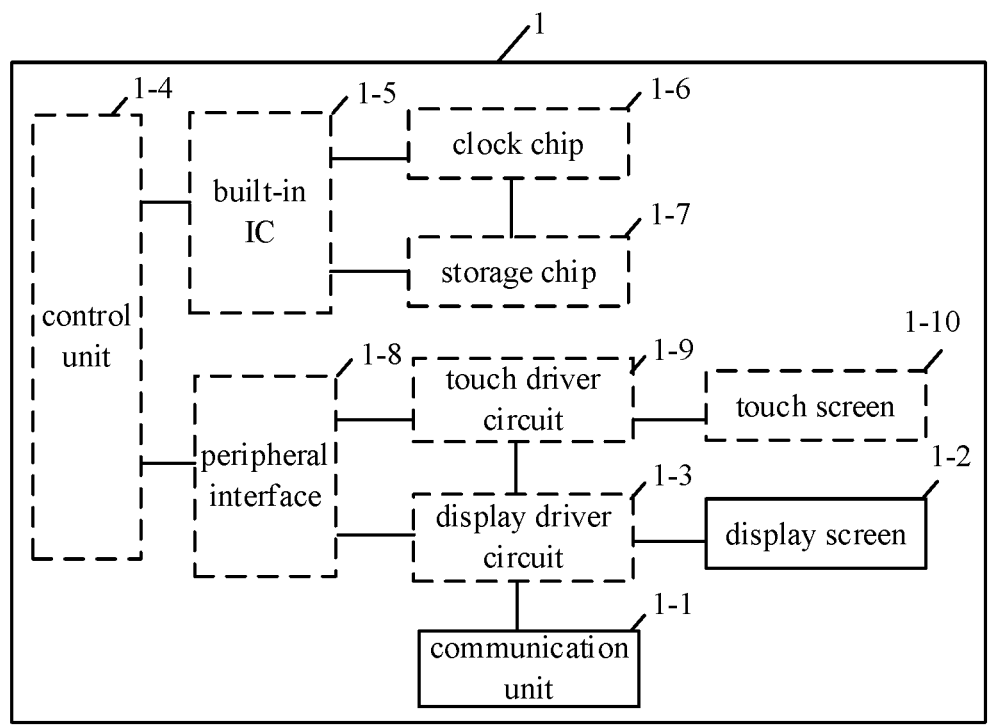
FIG. 1 is a structural block diagram of an employee card provided by embodiments of the present disclosure.

FIG. 1 is a structural block diagram of an employee card provided by embodiments of the present disclosure. As shown in FIG. 1, the employee card 1 includes a communication unit 1-1 and a display screen 1-2.

The communication unit 1-1 is configured to receive, according to a distinguishable identifier of the employee card, employee-related information corresponding to the distinguishable identifier.

The distinguishable identifier is an information identifier in common use in the related technical field. The distinguishable identifier is configured to uniquely identify an employee card and establish a correspondence between the distinguishable identifier and the employee-related information.

In some embodiments, the distinguishable identifier is a unique electronic code of the employee card.

The display screen 1-2 is configured to display the employee-related information received by the communication unit 1-1.

The display screen 1-2 is configured to obtain the employee-related information from the communication unit 1-1 and display the employee-related information.

In some embodiments, the employee-related information includes at least one of following information: employee name, employee job title, employee job code and department to which an employee belongs.

For example, the employee-related information only includes employee name and department to which the employee belongs; or the employee-related information includes employee name, employee job title and department to which the employee belongs.

In some embodiments, the employee job code identifies employee job title and department to which the employee belongs, and the employee-related information includes employee name and employee job code.

In some embodiments of the present disclosure, it is determined depending on the demand of enterprise activity whether enterprise name or other related information identifying the enterprise is added to the employee-related information.

In some embodiments of the present disclosure, the employee card serves as a work card for a temporary visitor, and according to the information of the temporary visitor, corresponding content is written to the employee card.

Figure 2:
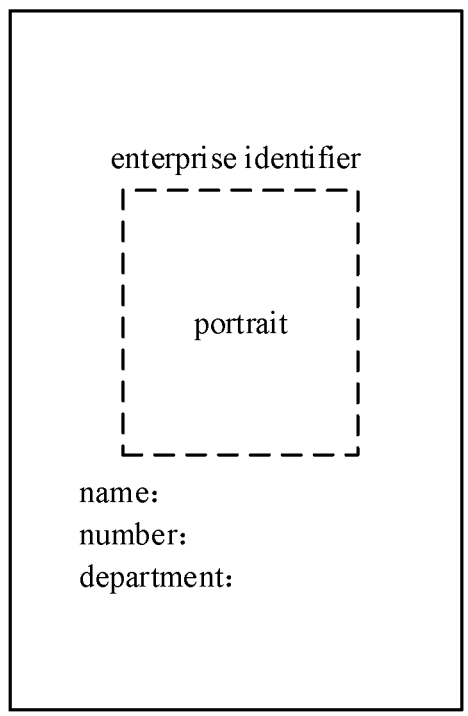
FIG. 2 is a schematic diagram of a front side of an employee card provided by some embodiments of the present disclosure.

FIG. 2 is a schematic diagram of a front side of an employee card provided by some embodiments of the present disclosure. As shown in FIG. 2, the front side of the employee card includes a display screen and a housing of the employee card for encasing and protecting the display screen.

In some embodiments, as shown in FIG. 2, the employee card displays an enterprise identifier, an employee portrait, an employee name, an employee number and department information.

In some embodiments of the present disclosure, the communication unit 1-1 is disposed on the top of the display screen.

In some embodiments of the present disclosure, the display screen 1-2 is designed to have a multi-page display function and, in doing so, may be provided with a touch screen or a button based on the related art to enable a flip through displayed pages.

In the foregoing embodiments of the present disclosure, the employee card provided with the display screen may be reused and dispenses with the need of customization, thereby enriching the function of the employee card, improving the utilization of the employee card by the enterprise, and reducing the time in customizing the employee card and the resource consumption.

In some embodiments, as shown in FIG. 1, the employee card 1 further includes: a display driver circuit 1-3, a control unit 1-4, a built-in IC 1-5, a clock chip 1-6, a storage chip 1-7 and a peripheral interface 1-8.

The display screen 1-2 is coupled to the display driver circuit 1-3, and the display screen 1-2 is coupled to the control unit 1-4 via the peripheral interface 1-8.

The display screen 1-2 is coupled to the display driver circuit 1-3, the display driver circuit 1-3 is coupled to the peripheral interface 1-8, and the peripheral interface 1-8 is coupled to the control unit 1-4.

The communication unit 1-1 is coupled to the control unit 1-4.

The communication unit 1-1 is coupled to the display driver circuit 1-3, the display driver circuit 1-3 is coupled to the peripheral interface 1-8, and the peripheral interface 1-8 is coupled to the control unit 1-4.

The built-in IC 1-5 is coupled to the clock chip 1-6, and is coupled to the storage chip 1-7.

The control unit 1-4 is coupled to the peripheral interface 1-8, and is coupled to the built-in IC 1-5.

In some embodiments, the peripheral interface 1-8 includes a serial peripheral interface (Serial Peripheral Interface, SPI).

In some embodiments of the present disclosure, the clock chip 1-6 is configured to switch the employee card to a low power mode if it is determined that there is no operation or data update in the employee card for a preset time duration; and the storage chip 1-7 is configured to store the distinguishable identifier of the employee card and information transmitted by a server or other employee cards.

In some embodiments, the control unit 1-4 serves as a processor of the employee card.

In some embodiments, the control unit 1-4 is a microcontroller unit (Microcontroller Unit, MCU).

In some embodiments, the employee card 1 further includes a power supply and an analog-to-digital converter (ADC).

In some embodiments, the power supply is coupled to the ADC, and after the ADC completes an analog-to-digital conversion, the display screen 1-2 displays a remaining power of the employee card.

Figure 3:
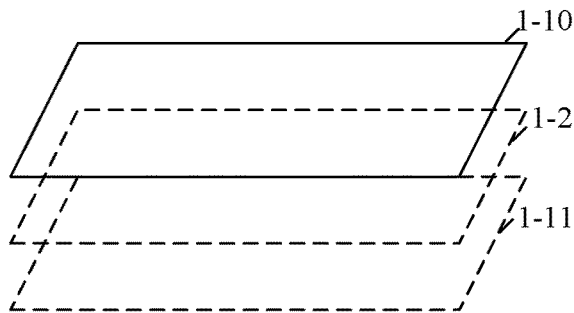
FIG. 3 is a schematic structural diagram of an employee card provided by some embodiments of the present disclosure.

FIG. 3 is a schematic structural diagram of an employee card provided by some embodiments of the present disclosure. As shown in FIG. 3, the employee card 1 includes a touch screen 1-10, a display screen 1-2 and a printed circuit board (Printed Circuit Board, PCB) 1-11.

The communication unit 1-1, a touch driver circuit 1-9, the display driver circuit 1-3, the control unit 1-4, the built-in IC 1-5, the clock chip 1-6, the storage chip 1-7 and the peripheral interface 1-8 are packaged on the PCB 1-11.

In some embodiments, as shown in FIG. 1 and FIG. 3, the employee-related information further includes a contact list. The employee card 1 further includes the touch driver circuit 1-9 and a touch screen 1-10 coupled to the touch driver circuit 1-9.

In some embodiments, the communication unit 1-1 is configured to establish a communication connection between the employee card 1 and other employee cards, and push contact details selected from the contact list to the other employee cards according to touch operation information obtained from the touch screen 1-10.

In some embodiments, the touch screen 1-10 overlies the display screen 1-2, the touch driver circuit 1-9 is coupled to the touch screen 1-10, the touch driver circuit 1-9 is coupled to the peripheral interface 1-8, the peripheral interface 1-8 is coupled to the control unit 1-4, and the touch screen 1-10 is configured to receive the touch operation information for selecting contact details from the contact list and pushing the contact details.

In some embodiments of the present disclosure, the contact list includes at least one of following information: a mobile number, a telephone number, a mail-box address, or an account number of an instant messaging.

In some embodiments, the employee card establishes a communication connection to other employee card by means of a wireless communication interaction method, e.g., a Bluetooth-based wireless communication authentication method.

The transmission of the contact list may be implemented by the wireless communication interaction method.

In some embodiments of the present disclosure, the process of pushing the contact list is illustrated by taking a first employee card and a second employee card for example. In some embodiments, the first and second employee cards have a structure similar to that of the aforementioned employee card 1.

Figure 4:
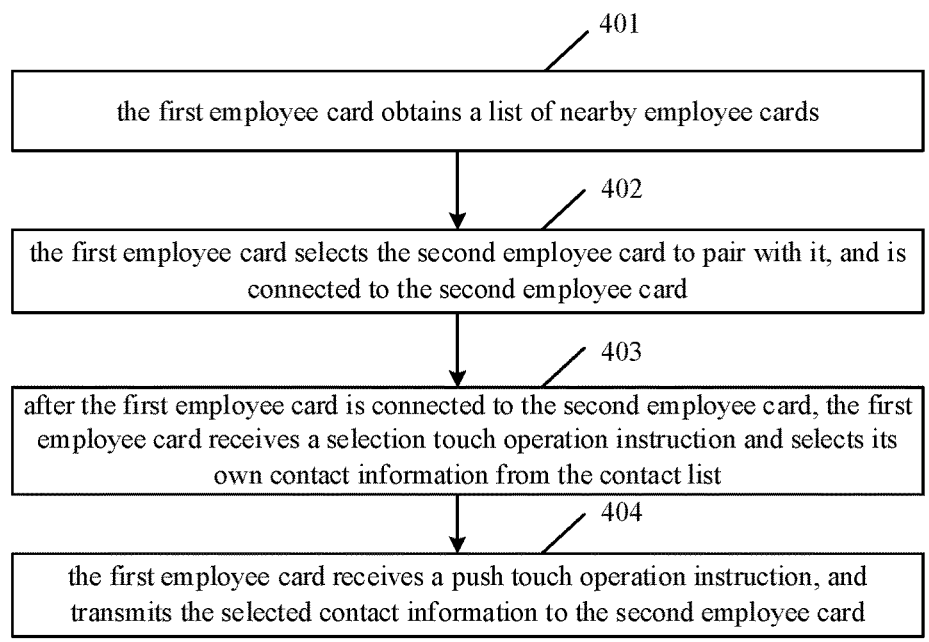
FIG. 4 is a flow chart of a process for address book operations provided by some embodiments of the present disclosure.

FIG. 4 is a flow chart of a process for address book operations provided by some embodiments of the present disclosure. As shown in FIG. 4, the process includes a step 401, a step 402, a step 403 and a step 404.

In the step 401, the first employee card obtains a list of nearby employee cards.

In the step 402, the first employee card selects the second employee card to pair with it, and is connected to the second employee card.

In the step 403, after the first employee card is connected to the second employee card, the first employee card receives a selection touch operation instruction and selects its own contact information from the contact list.

In the step 404, the first employee card receives a push touch operation instruction, and transmits the selected contact information to the second employee card.

The touch operation information includes the selection touch operation instruction and the push touch operation instruction. The selection touch operation instruction is configured to instruct the first employee card to select specific information (e.g., contact information), and the push touch operation instruction is configured to instruct the first employee card to transmit the specific information.

Based on the aforementioned process, the second employee card receives the contact information from the first employee card. Having received the contact information, the second employee card stores the contact information in a preset storage path in accordance with the related art.

In some embodiments, the communication unit 1-1 is further configured to receive a notification message from a base station, and the display screen 1-2 is further configured to display the notification message received by the communication unit 1-1.

That is, the display screen 1-2 is further configured to obtain the notification message from the communication unit 1-1 and display the notification message.

According to aforementioned embodiments of the present disclosure, transmission of an emergency notification message is achieved by means of the employee card, thereby alleviating the problem that important notification message may be missed in case that the employee is not at post or the employee cannot be reached through mobile communication.

In some embodiments of the present disclosure, the notification message includes an update message for the contact list.

By transmitting the contact list to the employee card as a notification, an efficient update of the contact list is achieved.

For example, when a change occurs to the contact information stored by a user, the change to the contact list is notified to the employee through the notification message, and a new version is displayed.

In some embodiments of the present disclosure, the user deletes or modifies the contact information based on the actual situation.

In some embodiments of the present disclosure, an alert with respect to the notification message is given via at least one of flickering of a light and vibration of a motor.

For example, a corresponding indicator light is provided on top of the employee card to give an alert with respect to the notification message.

In some embodiments of the present disclosure, the storage chip of the employee card is divided into multiple partitions for a categorized storage of various kinds of data.

For example, the storage chip is divided into a first partition and a second partition, where the first partition is configured to store the employee-related information, the contact list and the notification information, and the second partition is configured to store information obtained in the interactive communication between the employee card and other employee cards.

In some embodiments of the present disclosure, the employee card is further configured to edit and store information.

For example, the employee card is configured to perform at least one of following operations: modifying the received address book, or creating a memo on some issues.

In some embodiments, the display screen 1-2 is an electrophoretic ink (E-ink) screen.

In case that an E-ink screen is used as the display screen, the power consumption of the E-ink screen is negligible when no variation to the display content occurs.

In some embodiments of the present disclosure, the employee card adopts a low power-consumption design based on the requirement of daily usage, that is, the communication unit, the control unit, the display screen and the touch screen are all low power-consumption components.

In some embodiments of the present disclosure, the employee card further includes a power supply capable of supporting extended operation of the employee card.

For example, the power supply is implemented with a button battery, a chewing gum battery or a solar panel.

In comparison with the related art, the employee card in the technical solution of the present application includes a communication unit and a display screen coupled to the communication unit. The communication unit is configured to receive, according to a distinguishable identifier of the employee card, employee-related information corresponding to the distinguishable identifier; and the display screen is configured to display the employee-related information received by the communication unit, where the employee-related information includes at least one of following information: employee name, employee job title, employee job code or department to which the employee belongs. In aforementioned embodiments of the present disclosure, the employee-related information is displayed on an electronic display screen, thereby enriching the function of the employee card, and reducing the time and resource spent on making the employee card.

Figure 5:
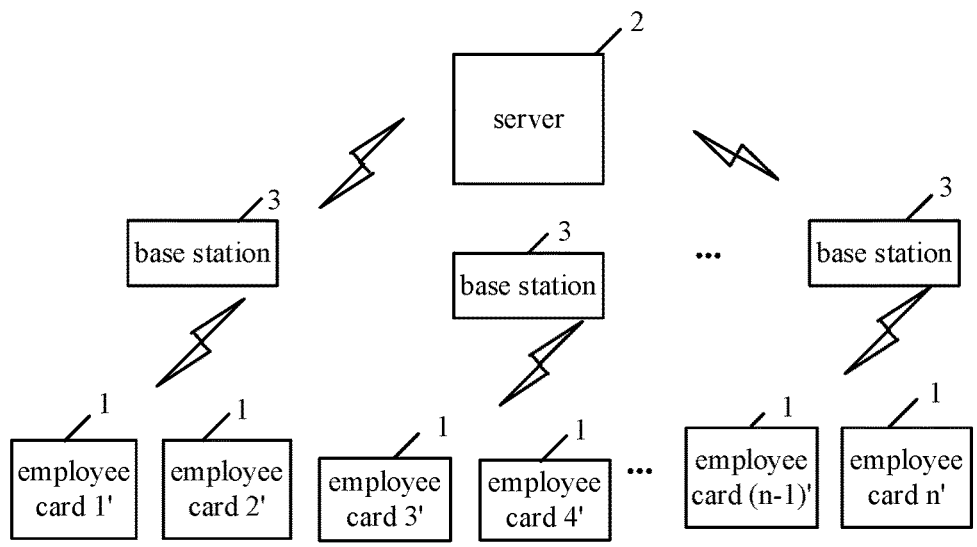
FIG. 5 is a structural block diagram of an employee information management system provided by some embodiments of the present disclosure.

FIG. 5 is a structural block diagram of an employee information management system provided by some embodiments of the present disclosure. As shown in FIG. 5, the employee information management system includes an employee card 1 and a server 2.

The server 2 is configured to transmit, according to a distinguishable identifier of the employee card 1, the employee-related information corresponding to the distinguishable identifier, to the employee card 1.

The employee card 1 includes a communication unit 1-1 and a display screen 1-2.

The communication unit 1-1 is configured to receive, according to a distinguishable identifier of the employee card 1, employee-related information corresponding to the distinguishable identifier.

The display screen 1-2 is configured to display the employee-related information received by the communication unit 1-1.

In some embodiments, the employee-related information includes at least one of following information: employee name, employee job title, employee job code or department to which the employee belongs.

For example, the employee-related information includes employee name and department to which the employee belongs only; or the employee-related information includes employee name, employee job title and department to which the employee belongs.

In some embodiments, employee job code identifies employee job title and department to which the employee belongs, and the employee-related information includes employee name and employee job code.

In some embodiments, the employee card 1 further includes: a display driver circuit 1-3, a control unit 1-4, a built-in IC 1-5, a clock chip 1-6, a storage chip 1-7 and a peripheral interface 1-8.

The display screen 1-2 is connected to the display driver circuit 1-3, then the display screen 1-2 is connected to the control unit 1-4 via the peripheral interface 1-8.

The communication unit 1-1 is connected to the control unit 1-4.

The built-in IC 1-5 is connected to the clock chip 1-6, and is connected to the storage chip 1-7.

The control unit 1-4 is connected to the peripheral interface 1-8, and is connected to the built-in IC 1-5.

In some embodiments, the employee-related information further includes a contact list. The employee card 1 further includes the touch driver circuit 1-9 and a touch screen 1-10 connected to the touch driver circuit 1-9.

In some embodiments, the communication unit 1-1 is configured to establish a communication connection between the employee card 1 and other employee cards, and push a selected contact list to the other employee cards according to touch operation information obtained from the touch screen 1-10.

In some embodiments, the touch screen 1-10 overlies the display screen 1-2, the touch screen 1-10 is connected to the control unit 1-4 via the touch driver circuit 1-9, and the touch screen 1-10 is configured to receive the touch operation information for selecting a contact list and pushing the selected contact list.

The touch screen 1-10 is connected to the touch driver circuit 1-9, the touch driver circuit 1-9 is connected to the peripheral interface 1-8, and the peripheral interface 1-8 is connected to the control unit 1-4.

In some embodiments, the employee information management system further includes a base station 3; the server 2 is further configured to transmit a notification message to the base station 3; the base station 3 is configured to receive the notification message from the server 2 and transmit the notification message to at least one employee card 1.

The communication unit 1-1 is further configured to receive the notification message from the base station 3.

The display screen 1-2 is further configured to display the notification message received by the communication unit 1-1.

The display screen 1-2 is further configured to obtain the notification message from the communication unit 1-1 and display the notification message.

In some embodiments, the employee information management system includes one base station 3, the server 2 transmits a notification message to the base station 3, and the base station 3 receives the notification message from the server 2 and transmits the notification message to at least one employee card 1.

In some embodiments, as shown in FIG. 3, the employee information management system includes multiple base stations 3 (one or more base stations 3), the server 2 transmits the notification message to the multiple base stations 3, and each base station 3 receives the notification message from the server 2 and transmits the notification message to at least one employee card 1.

In some embodiments of the present disclosure, the base station 3 is a Bluetooth base station.

The Bluetooth base station is designed in accordance with an analysis of the movement range of employees of the enterprise.

In some embodiments, the base station 3 is further configured to determine a signal strength of the communication unit 1-1 of the employee card 1, and feed back the signal strength to the server 2; and the server 2 is further configured to determine, according to the signal strength of the communication unit corresponding to the employee card 1, at least one of position information or moving track information of the employee card 1.

In some embodiments of the present disclosure, the position information and the moving track information of the employee are determined based on the related art. Table 1 is information on the signal strengths obtained by the server 2 in some embodiments of the present disclosure.

TABLE 1

|  | employee card 1' | employee card 2' | employee card 3' | ... | employee card n' |
|---|---|---|---|---|---|
| base station 3-1 | RSSI 11 | 0 | 0 | ... | RSSI 1n |
| base station 3-2 | 0 | RSSI_22 | RSSI_23 | ... | 0 |
| base station 3-3 | 0 | RSSI_32 | RSSI_33 | ... | 0 |
| ... | ... | ... | ... | ... | ... |
| base station 3-m | RSSI m1 | RSSI m2 | RSSI m3 | ... | RSSI mn |

As shown in table 1, after the server 2 stores the signal strengths of the communication units 1-1 of the employee card 1 (employee card 1', employee card 2', employee card 3', ..., employee card n') obtained by the base stations 3 (base station 3-1, base station 3-2, base station 3-3, ..., base station 3-$m$), the server 2 determines the position of the employee card 1 (i.e., the position of the employee wearing the employee card 1) in accordance with a correspondence between the signal strength and distance by using an algorithm in the related art. The m denotes a number of the base stations 3, and n denotes a number of the employee cards 1.

Assuming all signal strengths (received signal strength indication (RSSI) values) obtained for the employee card 3' in the table 1 are (0, RSSI_23, RSSI_33, ..., RSSI_m3), these signal strengths (RSSI values) are ordered, then a maximum value and a minimum value are deleted, the three largest values among the remainder are selected: RSSI_23, RSSI_53, RSSI_93. The distances R from the employee card 3' to the three base stations (base station 3-2, base station 3-5, base station 3-9) are calculated according to a distance conversion formula: $RSSI(R) = -(10*n*lgR + A)$, where, n is a signal propagation constant (also known as propagation index), R is a distance to the signal transmitter, and A is the received signal strength value at a distance of 1 meter.

According to the formula $RSSI\_23 = -(10*n*lgR1 + A)$, the distance R1 from the employee card 3' to the base station 3-2 is obtained; according to the formula $RSSI\_53 = -(10*n*lgR2 + A)$, the distance R2 from the employee card 3' to the base station 3-5 is obtained; and according to the formula $RSSI\_93 = -(10*n*lgR3 + A))$, the distance R3 from the employee card 3' to the base station 3-9 is obtained.

According to a coordinate (x1, y1) of the base station 3-2, a coordinate (x2, y2) of the base station 3-5, a coordinate (x3, y3) of the base station 3-9 and the foregoing distances R1, R2 and R3, a coordinate (x0, y0) of the employee card 3' (i.e., the employee wearing the employee card 3') is calculated using the triangulation formulas:

$$(x1-x0)^2 + (y1-y0)^2 = R1^2,$$

$$(x2-x0)^2 + (y2-y0)^2 = R2^2,$$

$$(x3-x0)^2 + (y3-y0)^2 = R3^2.$$

In the foregoing embodiments of the present disclosure, the positioning information is a rough estimate, the area where the employee wearing the employee card is located is determined by means of the estimate, and after an analysis has been performed for a period of time, the movement range of the employee wearing the employee card within the boundary of the enterprise may be determined.

In some embodiments, the display screen is an E-ink screen.

In comparison with the related art, the employee card in the technical solution of the present application includes a communication unit and a display screen. The communication unit is configured to receive, according to a distinguishable identifier of the employee card, employee-related information corresponding to the distinguishable identifier; and the display screen is configured to display the employee-related information received by the communication unit, where the employee-related information includes at least one of following information: employee name, employee job title, employee job code or department to which the employee belongs. In aforementioned embodiments of the present disclosure, the employee-related information is displayed on an electronic display screen, thereby enriching the function of the employee card, and reducing the time and resource spent on making the employee card.

Figure 6:
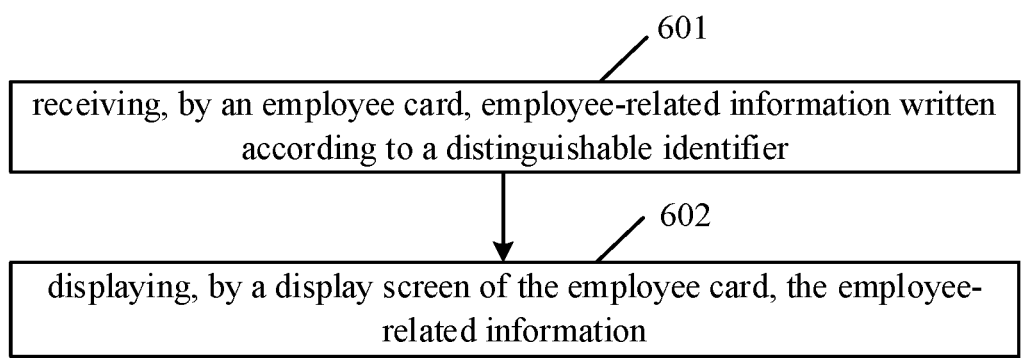
FIG. 6 is a flow chart of an employee information management method provided by some embodiments of the present disclosure.

FIG. 6 is a flow chart of an employee information management method provided by some embodiments of the present disclosure. As shown in FIG. 6, the method includes a step 601 and a step 602.

In the step 601: receiving, by an employee card, employee-related information written according to a distinguishable identifier.

In the step 602: displaying, by a display screen of the employee card, the employee-related information.

The employee-related information includes at least one of following information: employee name, employee job title, employee job code or department to which the employee belongs.

In some embodiments, after the receiving, by the employee card, the employee-related information written according to the distinguishable identifier, the employee information management method further includes: establishing, by the employee card, a communication connection to other employee card; and after the employee card selects information from a contact list according to touch operation information, pushing, by the employee card, the selected information to the other employee card to which the communication connection is established.

In some embodiments, the other employee card includes one or more other employee cards.

In some embodiments, after receiving, by the employee card, the employee-related information written according to the distinguishable identifier, the employee information management method further includes: receiving, by the employee card, a notification message from a base station; where the notification message is transmitted by a server to the base station.

In some embodiments, after receiving, by the employee card, the employee-related information written according to the distinguishable identifier, the employee information management method further includes: determining, by the server, at least one of position information or moving track information of the employee card by means of at least three base stations.

In some embodiments, the display screen of the employee card is an E-ink screen.

In case that an E-ink screen is used as the display screen, the power consumption of the E-ink screen is negligible when no variation to the display content occurs.

It is understood by one of ordinary skill in the art that, all or part of the steps of the aforementioned method may be implemented by a program which instructs related hardware (e.g., a processor). The program is stored in a computer readable storage medium such as a read-only memory (ROM), magnetic disk or optical disc. In some embodiments, all or part of the steps of the aforementioned embodiments may be implemented with one or more ICs. Accordingly, each module/unit of the aforementioned embodiments may be implemented in form of hardware, e.g., the corresponding function thereof is implemented with an IC, or may be implemented in form of software functional module, e.g., the corresponding function thereof is implemented by executing, by a processor, the program/instructions stored in a storage. The present disclosure is not limited to any combination of specific forms of hardware and software.

Specific embodiments disclosed by the present disclosure are described above, but the description is merely given for ease of understanding of the present disclosure, and the present disclosure is by no means limited thereto. Those skilled in the art may make any modifications or substitutions with respect to the form or details of the embodiments without departing from the scope disclosed in the present disclosure. However, the scope of the present disclosure is to be determined by the scope of the appended claims.

What is claimed is:

1. An employee card, comprising: a communication unit, a display screen coupled to the communication unit, a display driver circuit, a control unit, a built-in integrated circuit (IC), a clock chip, a storage chip and a peripheral interface, wherein, the communication unit is configured to receive, according to a distinguishable identifier of the employee card, employee-related information corresponding to the distinguishable identifier;

the display screen is configured to obtain the employee-related information from the communication unit and display the employee-related information, wherein the employee-related information comprises at least one of following information: an employee name, an employee job title, an employee job code, or a department to which an employee belongs; and the display screen is coupled to the display driver circuit, the display driver circuit is coupled to the peripheral interface, and the peripheral interface is coupled to the control unit;

the communication unit is coupled to the control unit;

the built-in IC is coupled to the clock chip and the storage chip;

the control unit is coupled to the peripheral interface and the built-in IC, wherein the employee-related information further comprises a contact list, and the employee card further comprises a touch driver circuit and a touch screen coupled to the touch driver circuit;

the communication unit is configured to establish a communication connection between the employee card and other employee card, and push information selected from the contact list to the other employee card according to touch operation information from the touch screen; and the touch screen overlies the display screen, and the touch screen is coupled to the control unit via the touch driver circuit, and is configured to receive the touch operation information for selecting the information from the contact list and pushing the information.

2. The employee card according to claim 1, wherein, the communication unit is further configured to receive a notification message from a base station; and the display screen is further configured to obtain the notification message from the communication unit and display the notification message.

3. The employee card according to claim 1, wherein the display screen is an electrophoretic ink (E-ink) screen.

4. The employee card according to claim 1, wherein the clock chip is configured to switch the employee card to a low power mode in a case that it is determined that there is no operation or data update in the employee card for a preset time duration.

5. The employee card according to claim 1, wherein the communication unit comprises a communication circuit or a communication chip, and the control unit comprises a processor or a microcontroller unit (MCU); the storage chip is configured to store the distinguishable identifier of the employee card, the employee-related information corresponding to the distinguishable identifier, and information transmitted by a server or by another employee card; and the control unit is configured to add a name of an enterprise to which the employee belongs, or information for identifying the enterprise into the employee-related information, in a case that there is a demand of enterprise activity.

6. The employee card according to claim 1, further comprising: a control unit, a clock chip, a storage chip, a touch driver circuit, and a touch screen coupled to the touch driver circuit, wherein, the communication unit is configured to establish a communication connection between the employee card and other employee card, and push information selected from the contact list to the other employee card according to touch operation information from the touch screen; the touch screen overlies the display screen, and the touch screen is coupled to the control unit via the touch driver circuit, and is configured to receive the touch operation information for selecting the information from the contact list and pushing the information; the display screen is an electrophoretic ink (E-ink) screen; the clock chip is configured to switch the employee card to a low power mode in a case that it is determined that there is no operation or data update in the employee card for a preset time duration; and the storage chip is configured to store the distinguishable identifier of the employee card, the employee-related information corresponding to the distinguishable identifier, and information transmitted by a server or other employee card.

7. An employee information management system, comprising: a server and an employee card, wherein,
the server is configured to transmit, according to a distinguishable identifier of the employee card, employee-related information corresponding to the distinguishable identifier, to the employee card;
the employee card comprises a communication unit, a display screen coupled to the communication unit, a display driver circuit, a control unit, a built-in integrated circuit (IC), a clock chip, a storage chip and a peripheral interface, wherein,
the communication unit is configured to receive, according to a distinguishable identifier of the employee card, employee-related information corresponding to the distinguishable identifier;
the display screen is configured to obtain the employee-related information from the communication unit and display the employee-related information, wherein the employee-related information comprises at least one of following information: an employee name, an employee job title, an employee job code, or a department to which an employee belongs; and
the display screen is coupled to the display driver circuit, the display driver circuit is coupled to the peripheral interface, and the peripheral interface is coupled to the control unit;
the communication unit is coupled to the control unit;
the built-in IC is coupled to the clock chip and the storage chip;
the control unit is coupled to the peripheral interface and the built-in IC,
wherein the employee-related information further comprises a contact list, and the employee card further comprises a touch driver circuit and a touch screen coupled to the touch driver circuit;
the communication unit is configured to establish a communication connection between the employee card and other employee card, and push information selected from the contact list to the other employee card according to touch operation information from the touch screen; and
the touch screen overlies the display screen, and the touch screen is coupled to the control unit via the touch driver circuit, and is configured to receive the touch operation information for selecting the information from the contact list and pushing the information.

8. The employee information management system according to claim 7, further comprising: a base station; wherein,
the server is further configured to transmit a notification message to the base station;
the base station is configured to receive the notification message from the server and transmit the notification message to at least one employee card;
the communication unit is further configured to receive the notification message from the base station; and
the display screen is further configured to obtain the notification message from the communication unit and display the notification message.

9. The employee information management system according to claim 8, wherein,
the base station is further configured to determine a received signal strength of the communication unit of the at least one employee card and feed back the received signal strength to the server; and
the server is further configured to determine, according to the received signal strength, at least one of position information or moving track information of the at least one employee card.

10. The employee information management system according to claim 9, wherein the server is configured to determine a distance R between an employee card and a base station according to a received signal strength RSSI(R) of the employee card determined by the base station and a distance conversion formula RSSI(R)=(10*n*lgR+A), where n represents a signal propagation constant, and A represents a received signal strength value when the base station is at a distance of 1 meter from the employee card.

11. The employee information management system according to claim 10, wherein the server is further configured to:
receive the received signal strengths of the employee card fed back by a plurality of base stations;
select at least two base stations from the plurality of base stations, according to the received signal strengths of the employee card fed back by a plurality of base stations; and
calculate a position coordinate (x0, y0) of the employee card according to position coordinates (xm, ym) of the selected at least two base stations, distances Rm from the at least two base stations to the employee card, and a triangulation formula $(xm-x0)^2+(ym-y0)^2=Rm^2$.

12. The employee information management system according to claim 7, wherein the display screen is an electrophoretic ink (E-ink) screen.

13. An employee information management method, comprising:
receiving, by an employee card, employee-related information transmitted according to a distinguishable identifier; and displaying, by a display screen of the employee card, the employee-related information, wherein the employee-related information comprises at least one of following information: an employee name, an employee job title, an employee job code, or a department to which an employee belongs, wherein, after receiving, by the employee card, the employee-related information transmitted according to the distinguishable identifier, the method further comprises:

establishing, by the employee card, a communication connection between the employee card and other employee card; and selecting, by the employee card, information from a contact list according to touch operation information, and pushing, by the employee card, the selected information to the other employee card.

14. The employee information management method according to claim 13, wherein, after receiving, by the employee card, the employee-related information transmitted according to the distinguishable identifier, the method further comprises:

receiving, by the employee card, a notification message from a base station, wherein the notification message is transmitted by a server to the base station.

15. The employee information management method according to claim 14, wherein, after receiving, by the employee card, the employee-related information transmitted according to the distinguishable identifier, the method further comprises:

determining, by the server, at least one of position information or moving track information of the employee card by using at least three base stations.

* * * * *